(12) United States Patent
Kammel

(10) Patent No.: US 7,976,801 B2
(45) Date of Patent: Jul. 12, 2011

(54) SYSTEM AND METHOD FOR THE PROCESSING AND INCINERATION OF DIESEL EXHAUST PARTICULATE MATTER

(76) Inventor: Refaat Kammel, Jackson, MI (US)

( * ) Notice: Subject to any disclaimer, the term of this patent is extended or adjusted under 35 U.S.C. 154(b) by 0 days.

(21) Appl. No.: 12/596,110

(22) PCT Filed: May 23, 2008

(86) PCT No.: PCT/US2008/006659
§ 371 (c)(1),
(2), (4) Date: Oct. 15, 2009

(87) PCT Pub. No.: WO2008/153775
PCT Pub. Date: Dec. 18, 2008

(65) Prior Publication Data
US 2010/0111790 A1    May 6, 2010

Related U.S. Application Data

(60) Provisional application No. 60/940,123, filed on May 25, 2007, provisional application No. 61/015,875, filed on Dec. 21, 2007, provisional application No. 61/015,883, filed on Dec. 21, 2007.

(51) Int. Cl.
*B01D 46/00* (2006.01)
*B01D 53/56* (2006.01)
*B01D 53/94* (2006.01)
*F01N 3/10* (2006.01)

(52) U.S. Cl. .......... 423/212; 423/213.2; 423/213.5; 423/215.5; 423/DIG. 6; 422/105; 60/274; 60/282; 60/299

(58) Field of Classification Search .......... 422/105; 60/274, 282, 299; 423/212, 213.2, 213.5, 423/215.5, DIG. 6
See application file for complete search history.

(56) References Cited

U.S. PATENT DOCUMENTS

| | | |
|---|---|---|
| 5,097,665 A | 3/1992 | Kammel |
| 5,974,791 A | 11/1999 | Hirota et al. |
| 6,497,095 B2 | 12/2002 | Carberry et al. |
| 7,266,943 B2 | 9/2007 | Kammel |
| 2002/0078684 A1* | 6/2002 | Carberry et al. ........... 60/295 |
| 2005/0178111 A1* | 8/2005 | Kammel .................. 60/289 |
| 2008/0282675 A1* | 11/2008 | Stroia et al. ............. 60/285 |

OTHER PUBLICATIONS

Singapore Search Report and Singapore Written Opinion for Singapore Patent Application No. 200907555-7, mailed Jan. 5, 2011.
Egyptian Office Action for parallel Egyptian application.

* cited by examiner

*Primary Examiner* — Timothy C Vanoy
(74) *Attorney, Agent, or Firm* — Harness, Dickey & Pierce, P.L.C.

(57) ABSTRACT

A particulate converter for the collection and the incineration of particulate matters from diesel engine exhaust includes an exhaust path extending from the diesel engine through the particulate converter. The particulate converter further includes a housing and at least one candle located in the housing. An electrical incineration system may be electrically connected to a pulsed power supply for incinerating soot collected within the candle. A diesel oxidation catalyst (DOC) may be disposed in the exhaust path to generate sufficient amount of $NO_2$ to assist in incineration. At least one exhaust cooling device may be provided for the control of exhaust temperature. A feedback control system may control exhaust gas temperatures based on pressure drop across the DPC, temperature ahead of the DPC and engine RPM.

23 Claims, 9 Drawing Sheets

Detail B

SYSTEM AND METHOD FOR THE PROCESSING AND INCINERATION OF DIESEL EXHAUST PARTICULATE MATTER

CROSS REFERENCE TO RELATED APPLICATIONS

This application is a National Stage of International Application No. PCT/US2008/006659, filed on May 23, 2008. This application claims the benefit of U.S. Provisional Application Nos. 60/940,123, filed on May 25, 2007 and 61/015,875 filed on Dec. 21, 2007 and 61/015,883 filed on Dec. 21, 2007. The disclosures of the above applications are incorporated herein by reference.

FIELD

The present disclosure generally relates to after-treatment devices for diesel and natural-gas engines. More specifically, the present disclosure relates to the agglomeration, retention and incineration of particulate matter in a composite wire mesh candle. The present disclosure also more particularly relates to incineration through reliable and controlled processes.

INTRODUCTION

Particulate traps from the exhaust of diesel engines have received wide acceptance and are used for particulate emission compliance with various governmental regulations for on-road diesel engine application. The retrofitting of diesel engines with particulate traps is also recognized for improvement of ambient air quality with regard to particulate matter as well as fine particulate matter currently under USEPA regulations such as PM 10 and PM 2.5 standards. Particulate traps can achieve high particulate reduction that can reach 90% to 95%. Conventional particulate traps (e.g., wall-through traps and wire-mesh particulate traps) must be treated to combust the accumulated particulate matter and bring the device back to the original conditions. Regeneration is the process of combusting the accumulated soot and brings the filter, ceramic or wire-mesh, to the original condition to start another soot loading cycle, and so on.

Commonly assigned U.S. Pat. No. 7,266,943 describes an alternative to the regeneration process referred to as an incineration process. U.S. Pat. No. 7,266,943 is incorporated by reference as if fully set forth herein. While the teachings of U.S. Pat. No. 7,266,943 have proven to be successful for the incineration of particulate matter, a need for continuous improvement in the art remains.

SUMMARY

A composite wire mesh media collects, agglomerates, and releases large-size agglomerated particulates that are filtered on a retaining screen to form a soot cake. The retaining screen is connected to a pulsed DC power supply, and the power supply is engaged when certain soot cake density (build-up) is reached as manifested by the electrical resistance between the retaining screen and an upstream grounded screen. By incorporating a conventional diesel oxidation catalyst ahead of the composite wire mesh media, or by integrating catalyzed screens ahead of the composite wire mesh, some portion of NO is converted to $NO_2$. An incineration process is initiated and maintained when the need for incineration is triggered.

Incineration, as used herein, is defined as a slow process for the oxidation of collected soot on as needed basis. Sufficient soot should be maintained on the composite wire mesh media to ensure high particulate reduction efficiency. The resulting oxidation heat is diluted with exhaust gases, and as such no appreciable or detected temperature increase was found in the exhaust gases. Regeneration, on the other hand, is a process where all accumulated soot on a filtration media is burned and is usually associated with a significant temperature rise that reaches 700° C. or higher.

The present disclosure relates to an effective, efficient and reliable method for the incineration of agglomerated particulate matters from diesel exhaust. An incinerator design relies on trapping agglomerated soot substances on a retaining screen such as Dutch-weave screen, thus forming a cake on the upstream side. The Dutch-screen is attached to a pulsed DC power supply while the mating screen is grounded. The gap between the two screens is maintained constant by inserting ceramic-base separator in the form of a thread or a net. The space in the gap is maintained at the lowest practical size. Gap spacing in the order of approximately 0.010 to approximately 0.025 inches (0.25 to 0.50 mm) is desirable, with gaps in the small range being preferred since the size of particulates to be incinerated is reduced. A combination of pulsed direct current from a 12v-48v DC or higher power supply in addition to a moderate amount of $NO_2$, and exhaust temperatures above 200° C., as well as base-metal catalyst embedded in the incinerator gap were found to be effective in incinerating soot. As the exhaust temperatures rise to 300° C. to 375° C. range, the incineration process is accelerated and soot incinerates quickly. However, incineration as defined herein, is still a much slower process than regeneration. As a result, no appreciable temperature rise is observed in the incineration by-products, and the maximum local temperature at the incinerator screen (Dutch-screen) is below 500° C. This is primarily due to low soot ignition temperature as a result of base metal catalyst, $NO_2$ oxidation mode and exhaust gas cooling of the heat generated from incineration. Once the cake size is reduced as a result of soot oxidation, the electrical resistance across the incinerator increases prompting the electric power supply to stop until another soot layer builds up again for a new cycle.

Another feature of the present disclosure is the integration of oxidation catalyst with the particulate converter. This is achieved by incorporating a precious-metal coated screen on the upstream side of the composite wire mesh media. Such screen contains few wraps around the core of the device to allow for high impingement and interaction between the exhaust gases and the precious-metal sites. The existence of such screen, however, can produce certain sparks or hot spots under certain engine operating conditions which could ignite the soot nested inside the composite wire mesh. Although such an event is a low-probability event, it can be destructive to the wire mesh media. Therefore, a Dutch stainless-steel screen, employed as a spark-arrestor, is wrapped around the precious metal screen to prevent the possibility of igniting soot.

Due to employment of precious-metal catalysts, some $SO_2$ is converted to sulfate (particulate), and portion of nitrogen monoxide (NO) are converted to nitrogen dioxides ($NO_2$). Sulfate and $NO_2$ are not desirable pollutants. However, due to system arrangement, low exhaust velocity coupled with deep bed structure allow for high residence time for the exhaust gases to interact with nested soot (estimated to average 100 times that from a ceramic wall-through particulate trap). The net effect is virtual reduction of sulfates to sulfur dioxide ($SO_2$), incineration of some soot in the composite wire mesh, and virtual depletion of $NO_2$ to NO and nitrogen. The high interaction between $NO_2$ and soot in the wire mesh can also result in the total liberation of $O_2$ out of $NO_2$ resulting in NOx reduction which is estimated to reach 10-15% dependent on temperature. The net effect is an improved emission level of undesirable sulfate and nitrogen dioxide pollution. According to one particular aspect, the present teachings provide a system for the collection and incineration of particulate matter to clean exhaust of a diesel engine. The system includes a diesel particulate converter (DPC) having a housing and at least one candle located in the housing. An exhaust path extends from the diesel engine through the DPC. A diesel oxidation catalyst (DOC) disposed in the exhaust path. At least one exhaust cooling device is provided for the control of exhaust temperature. A feedback control system controls exhaust gas temperatures based on factors including pressure drop across the DPC, temperature ahead of the DPC and engine RPM.

According to another particular aspect, the present teachings provide a method of $NO_2$ incineration of particulate matter to clean exhaust of a diesel engine. The method includes providing a diesel particulate converter (DPC) having a housing and at least one candle located in the housing. Diesel engine exhaust is routed along an exhaust path extending from the diesel engine through the DPC and treated with a diesel oxidation catalyst (DOC) disposed in the exhaust path. Exhaust gas temperatures are controlled with a feedback control system through selective control of an exhaust cooling device as a function of pressure drop across the DPC, temperature ahead of the DPC and engine RPM. According to another particular aspect, the present teachings provide a diesel particulate converter for the incineration of particulate matters from diesel engine exhaust, the diesel particulate converter defines an exhaust path extending from the diesel engine through the DPC and includes a housing, at least one candle located in the housing, and an electrical incineration system adapted to be electrically connected to a pulsed power supply for incinerating soot collected within the candle.

According to another particular aspect, the present teachings provide a method of electrical incineration of particulate matter to clean exhaust of a diesel engine. The method includes providing a diesel particulate converter (DPC) having a housing and at least one candle located in the housing and routing diesel engine exhaust along an exhaust path extending from the diesel engine through the DPC. Agglomerated soot is collected within the at least one candle. The agglomerated soot is incinerated with an electrical incineration system electrically connected to a pulsed power supply.

BRIEF DESCRIPTION OF THE DRAWINGS

The drawings described herein are for illustration purposes only and are not intended to limit the scope of the present disclosure in any way.

DESCRIPTION OF VARIOUS FEATURES

Figure 1:
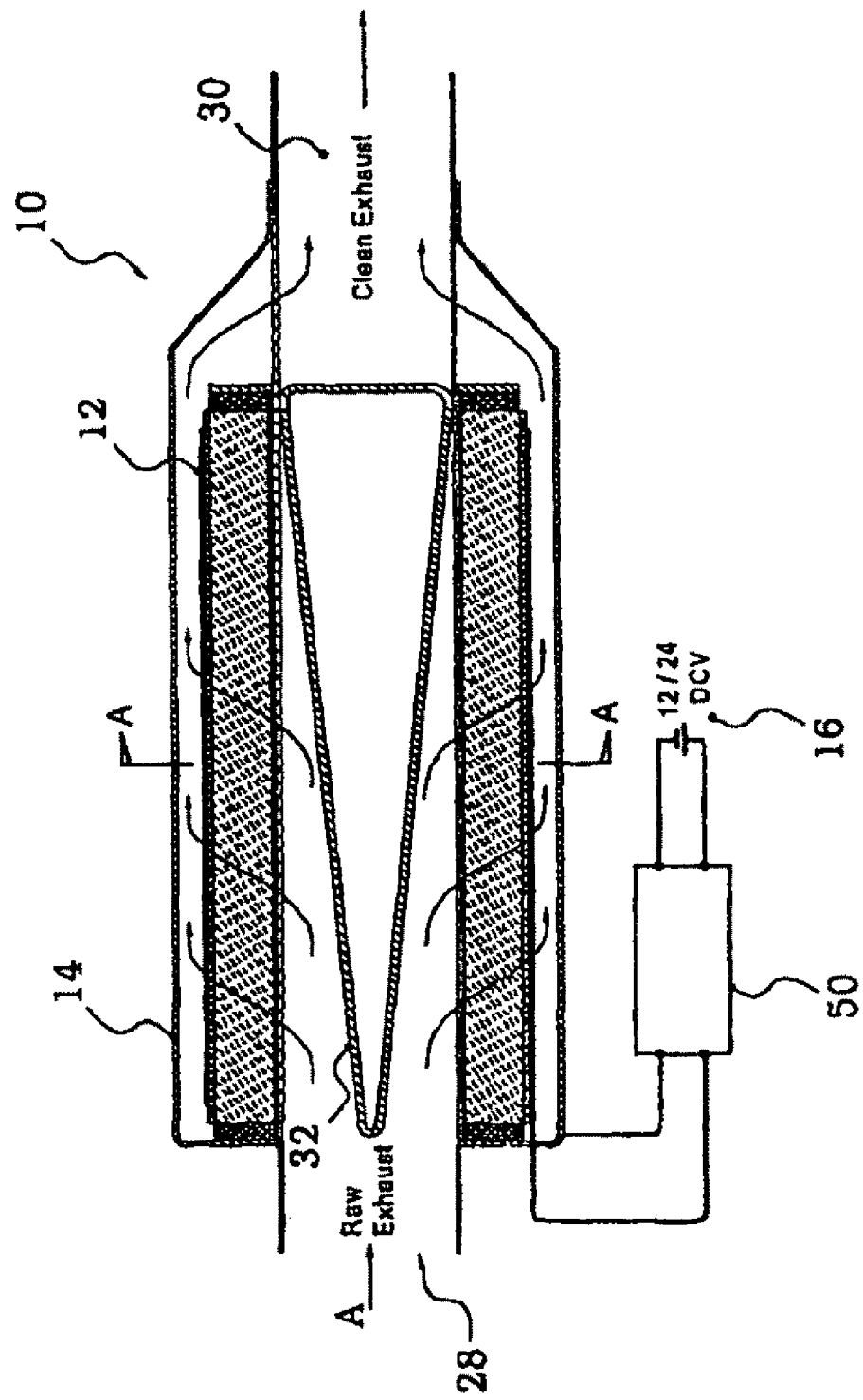
FIG. 1 is a longitudinal sectional view of a particulate converter for the incineration of particulate matters from diesel engine exhaust in accordance with the present teachings, the particulate converter illustrated to include a single candle.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

Figure 6:
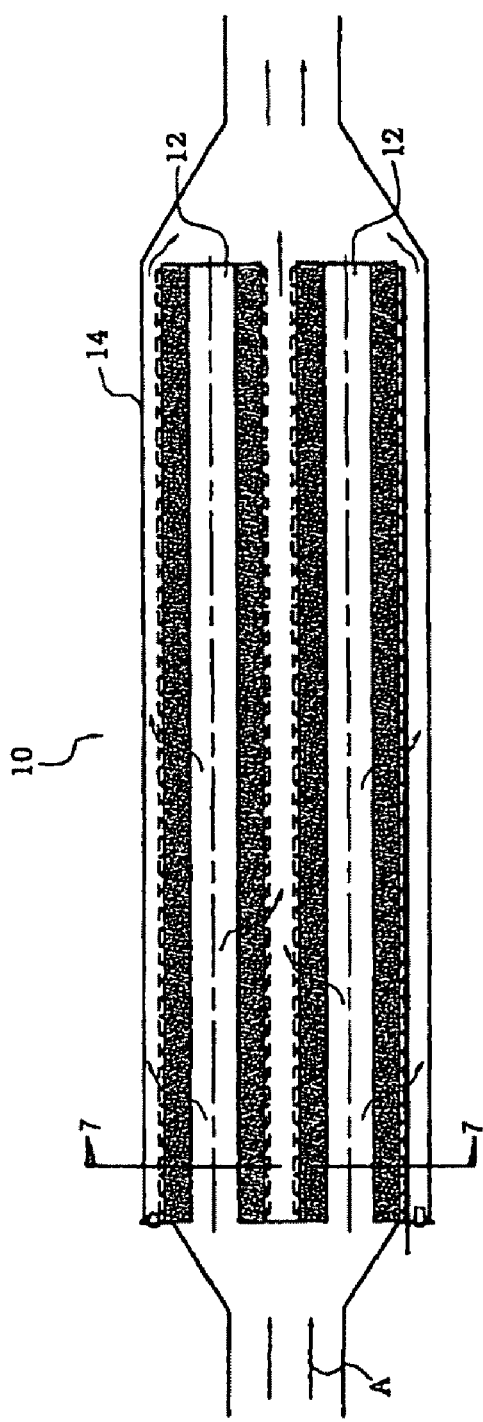
FIG. 6 is a longitudinal sectional view similar to FIG. 1 illustrating a particulate converter in accordance with the present teachings, including a plurality of candles.

With general reference to the drawings wherein reference numerals designate identical or corresponding parts throughout several views, diesel particulate converter (DPC) of the system and constructed in accordance with the present teachings is illustrated and generally identified at reference character 10. The particulate converter 10 of the present teachings may be utilized for internal combustion engines having appreciable amount of submicron or nano-size particles such as diesel engines, compressed or liquid natural gas engines. The particulate converter 10 may include at least one candle 12. FIG. 1, for example, illustrates a particulate converter 10 having a single candle 12. FIG. 6 illustrates a particulate converter 10 with a plurality of candles 12.

A. Candle

Figure 2:
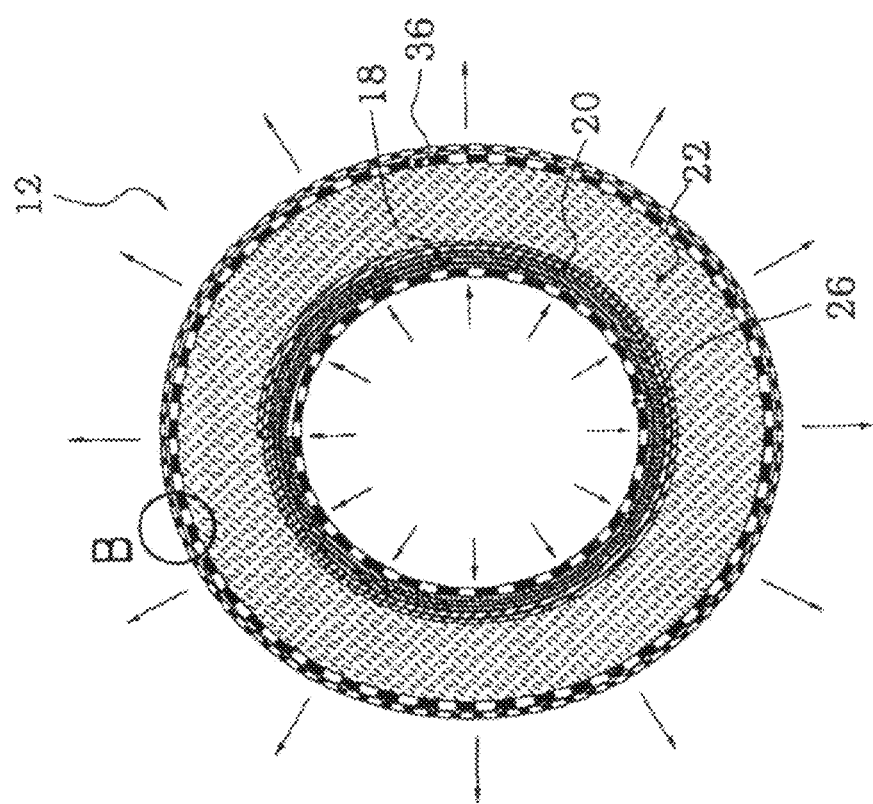
FIG. 2 is a cross-sectional view taken along the line 2-2 of FIG. 1.

With particular reference to FIG. 1 and FIG. 2, the candle 12 of the particulate converter 10 is shown mounted in a housing 14 and generally may uniformly allocate the incoming exhaust to inside core of the candle defined by tubular member 26. Insofar as the present teachings are concerned, it will be understood that the housing 14 and mounting of the candle 12 within the housing 14 are conventional to the extent not otherwise described herein.

FIG. 1 illustrates the candle 12 operatively associated with a power supply 16. The system may include a diesel oxidation catalyst (DOC) in the exhaust path. As shown, the candle 12 may incorporate the DOC. Additionally, the candle 12 may generally include a spark-arrest screen 20, a composite wire mesh agglomerator 22 and an electrical incinerator 24. The DOC is cooperative with engine exhaust temperature profiles to generate sufficient $NO_2$ for soot incineration on the composite wire mesh agglomerator 22, the incinerator gap 45 and the soot cake on the upstreamside of the retaining screens 42.

The candle 12 may include a generally tubular member 26 defining an intake port 28 and an outlet 30. Raw exhaust from a diesel engine, for example, is introduced to the candle 12 through the intake port 28 in the direction of arrow A. The candle 12 may be associated with a flow distributor 32. The flow distributor 32 may be mounted within member 26 and operate to radially direct the flow of raw exhaust uniformly. The flow distributor 32 may have a generally conical or cylindrical shape.

Tubular member 26 may be perforated along a substantial portion of its length to facilitate exhaust to flow in the radial direction. This arrangement allows for the reduction of exhaust flow velocity which can be adjusted through proper selection of the effective perforated candle length.

As perhaps most particularly shown in the sectional view of FIG. 2 of a candle 12, the diesel oxidation catalyst may be an integral component of the candle 12 and may be constructed of one or more layers of filtration screen 18. One suitable filtration screen 18 is well known in the art as a Dutch-screen. Other screens may be used, however. Throughout the remainder of this description, it will be understood that any reference to Dutch-screen may be substituted with other screening material know in the art within the scope of the present teachings.

The radial layers of Dutch-screen 18 may include openings sized to limit soot build up to a minimum and create a torturous flow path to arrest and cool high-temperature slugs to prevent self-ignition in the candle 12. While any number of radially disposed layers may be used, in certain embodiments, the layers of Dutch-screen may include 2 to 5 wraps. The screen 18 may be coated with platinum to enhance impingement and exchange between the gases and catalytic sites on the screen. The screen may also have wash coat such as alumina to amplify the catalyst surface area. Alternatively, the precious metal catalyst can be applied directly to the metallic screen by electroplating. The catalyzed Dutch-screen 18 thereby functions as a diesel oxidation catalyst. However, it is integrated within the same candle construction. Further, the screen may be sintered, brazed or manufactured in such a way so as to define a rigid wire mesh matrix.

Construction of DOC from rigid wire mesh matrix (knitted wires or shaved wires) provides added enhancement to the catalytic reaction and enhanced performances. Classical DOC are constructed of metallic or ceramic straight flow channels that can reach 200 channels per square inch or more. Such small-size flow channels convert exhaust flow from turbulent to laminar conditions. Laminar flow conditions are not effective for reaction between the exhaust and catalyst sites. On the other hand, the rigid wire mesh matrix increases turbulences and add localized turbulences. This may increase catalytic activities, reduce amount of precious metal loading and improve catalytic performance.

The catalyzed screen 18 may advantageously provide cost reduction through the elimination of hardware and the resolution of space constraints on some applications. The screen 18 further provides HC and CO reductions, as well as moderate conversion of NO to $NO_2$, dependent on exhaust temperature. Most undesirable impact of integrating the screen relates to the lowering of exhaust temperatures to guard against spontaneous ignition of soot in the candle which lowers the effectiveness of catalytic activities. However, reducing peak temperatures may extend the durability of the catalysts.

The candle 12 may additionally include a second radial layer in the form of an intermediate screen 20. The intermediate screen may be inserted after the Dutch-screen 18 to function as a spark-arrestor. The spark arrest screen 20 may be used interchangeably with a thermal stabilizer. The screen 20 may be selected to have wide openings to minimize soot build-up and torturous flow path for the purpose of cooling off any hot spots generated from catalytic reactions. In a way, the spark-arrestor screen 20 may function as a buffer between the precious metal screen 18 and the composite wire mesh or wire-mesh agglomerator 22, to substantially reduce the possibility of soot self-ignition. The composite wire mesh media 22 may follow the spark-arrestor 20. In this regard, the candle 12 includes a third radial layer in the form of the wire-mesh agglomerator 22.

The candle 12 may additionally include a ground screen 36 radially positioned outside the wire mesh media 22. The ground screen 22 may define larger openings. For example, the ground screen 36 may comprise a plain 40×40 mesh wrapped around the composite wire-mesh 22. One or multiple wraps are acceptable. The screen 36 may allow agglomerated particles to pass through, but provide adequate ground electrical contacts for soot trapped in the incinerator 24.

The candle 12 may additionally include a ceramic-based separator 40 followed by a Dutch-screen 42. The incinerator 24 may be defined by the ground screen 36, the separator 40 and the Dutch-screen 42. A base-metal catalyst 44 may be embedded also inside the incinerator 24. The function of the ceramic separator 40 is to provide electrical isolation between the outermost Dutch-screen 42 and the ground screen 40 through the establishment of a fixed gap 45. The ceramic separator 40 may be employed in the form of a ceramic thread or ceramic net, and should provide a wide opening area to allow for the build-up of a soot-cake in the incinerator gap 45. The incinerator gap 45 may be defined as the radial distance between screen 36 and screen 42.

The size of the gap 45 may be selected to be as small as possible. In this regard, the smallest size is limited by manufacturing dimensional tolerances which could result in electric short circuit. A minimum gap size may be approximately 0.01 inches (0.25 mm), although smaller gap could be used should tighter level of manufacturing tolerances is achieved. While an increased gap size may not be desirable, a gap size up to approximately 0.02 inches (0.5 mm) or larger may be acceptable in some applications.

The Dutch-screen 42 may be selected to have small openings. In this regard, the openings may be approximately 70 microns openings for effective capturing of agglomerated particles and forming a cake. Agglomerated soot particles migrating from the composite wire mesh media 22 may have sizes upwards of 100 microns or larger. These large particles can be captured easily on the upstream side of the Dutch-screen. Repeated tests demonstrate the build-up of soot cakes reaching over 0.5 mm in thickness. Cake build-up is assisted through low exhaust gas velocities in the incinerator. On and off-road engine operating cycles resulting in various exhaust velocities can be selected to ensure proper capturing of agglomerated soot to form a soot cake in the incinerator gap for the majority of the time. Maintaining a minimum cake thickness all the time is desirable as it functions as a filter resulting in high soot filtration efficiency.

As the soot cake continues to build up, it grows in depth until the soot cake fills the incinerator gap. Although soot deposits are not totally uniform, soot cake density increases with increase in soot build-up. Once soot cake touches the ground screen 36, electrical resistance between the two mating screens is established. Dependent on soot packing density, electrical resistance is lowered as soot electrical contacts between the two mating screens increases. For example, a resistance of one or two Ohms is reached on a candle 12 eighteen inches long and three inches incinerator diameter. Further, measured electrical resistance for the same soot cake was found to decrease substantially as the exhaust temperature increases, thus increasing electrical current leading to faster incineration. The wire mesh agglomerator 22, the incinerator gap and the retaining screens 42 cooperate to define a deep bed for soot collection having a long resident time.

A major contributor in assisting incineration of the soot cake is the application of electrical power to the Dutch-screen and the ground screen leading to slow soot combustion. Tests were conducted using both DC and AC power supply and AC was found to be more effective in initiating and continuing the incineration process. Low voltage was found to be effective with small incinerator gaps and temperatures over 200° C. A primary goal is to have the source of electric power based on 12V-48V DC, commonly used on most mobile applications. This led to the development of pulsed-power supply. Higher power supply voltage is acceptable, although voltage in excess of 60 volts could be destructive and, as such, may not be desirable.

Figure 7:
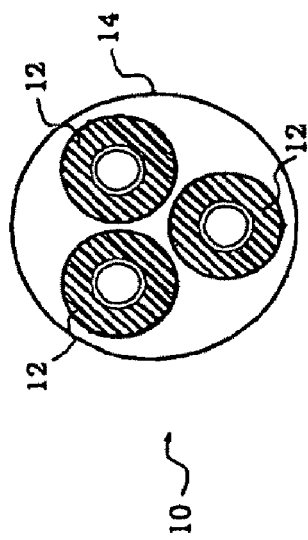
FIG. 7 is a cross-sectional view taken along the line 7-7 of FIG. 6.
Figure 8:
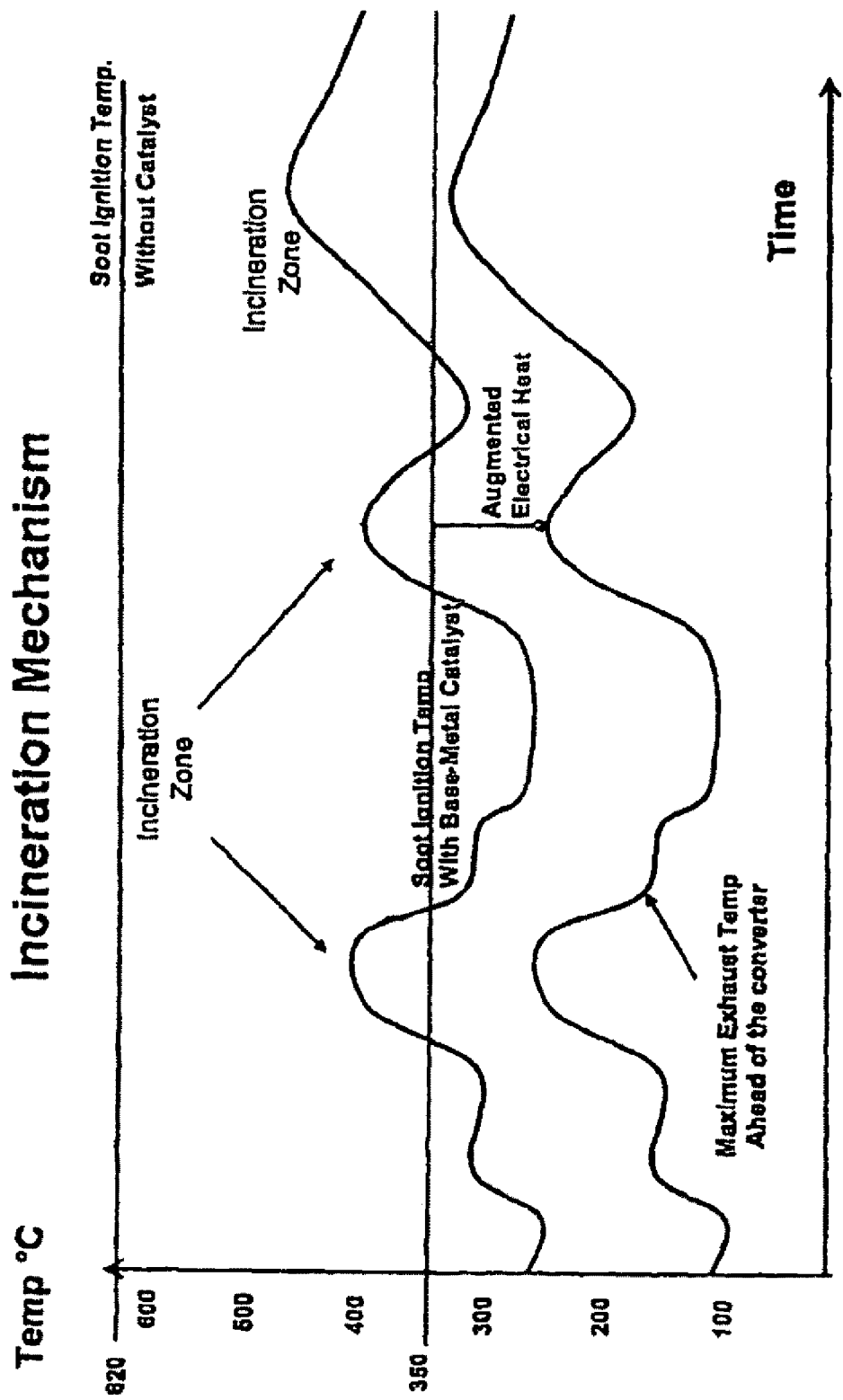
FIG. 8 is schematic diagram illustrating the probability of encountering effective incineration during typical diesel engine operating cycle.
Figure 9:
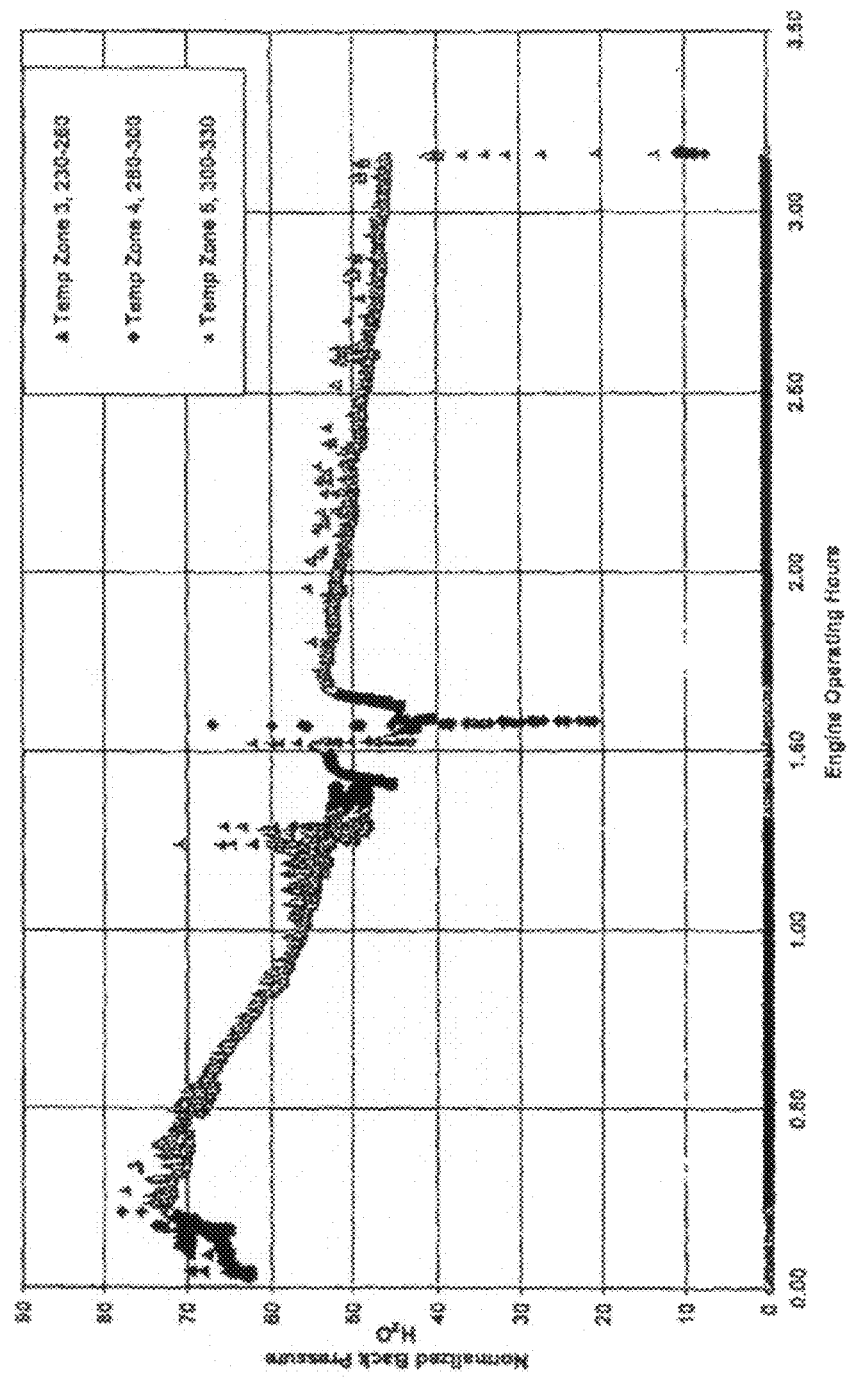
FIG. 9 is a schematic illustration showing typical results of incineration at 300°-330° C. and the corresponding drop in back-pressure over time.

FIGS. 6 and 7 illustrate another particulate converter 10 according to the present teachings. The embodiment of FIGS. 6 and 7 differs from the previously described embodiment by incorporating a plurality of candles 12. Like reference characters have been used to denote similar elements between the embodiments. As shown, the particulate converter 10 may include three candles 12. It will be understood, however, that a greater or lesser number of candles 12 may be utilized within the scope of the present teachings. The number of candles can be as high as it is needed for large diesel engines, such as diesel generators, locomotives and marine applications.

B. Electric Power Supply

Figure 3:
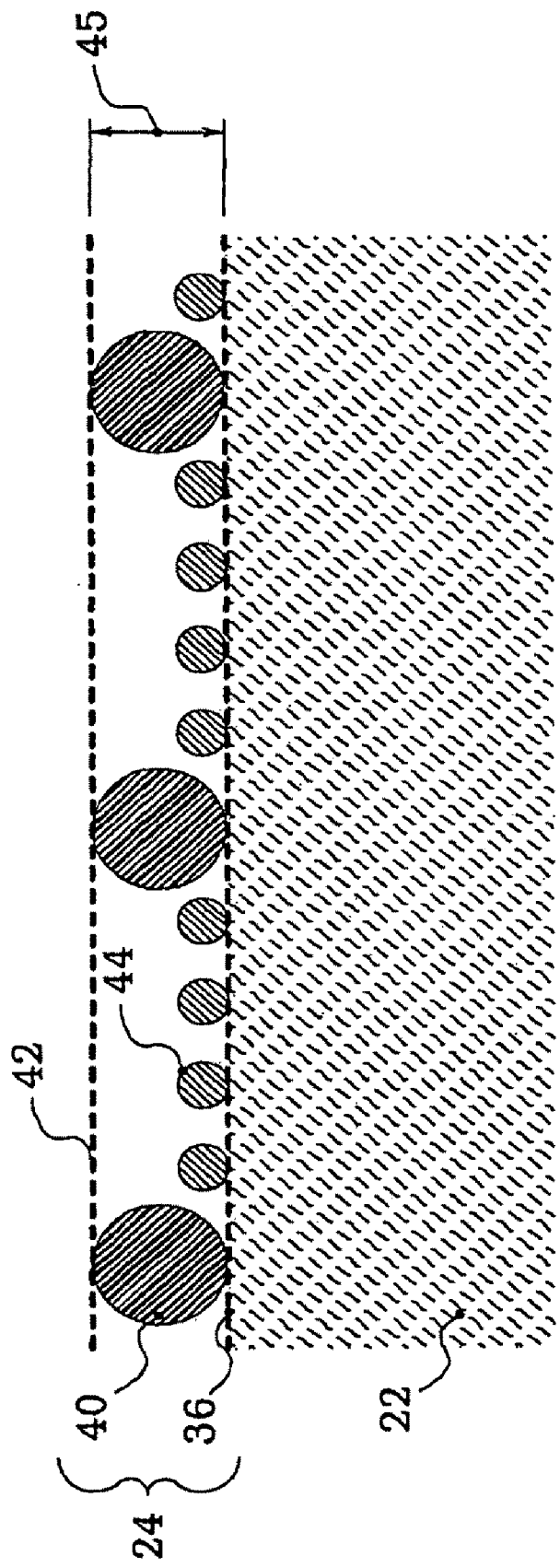
FIG. 3 is a detailed cross-sectional view of a portion of an incinerator, of the particulate converter of the present teachings.
Figure 4:
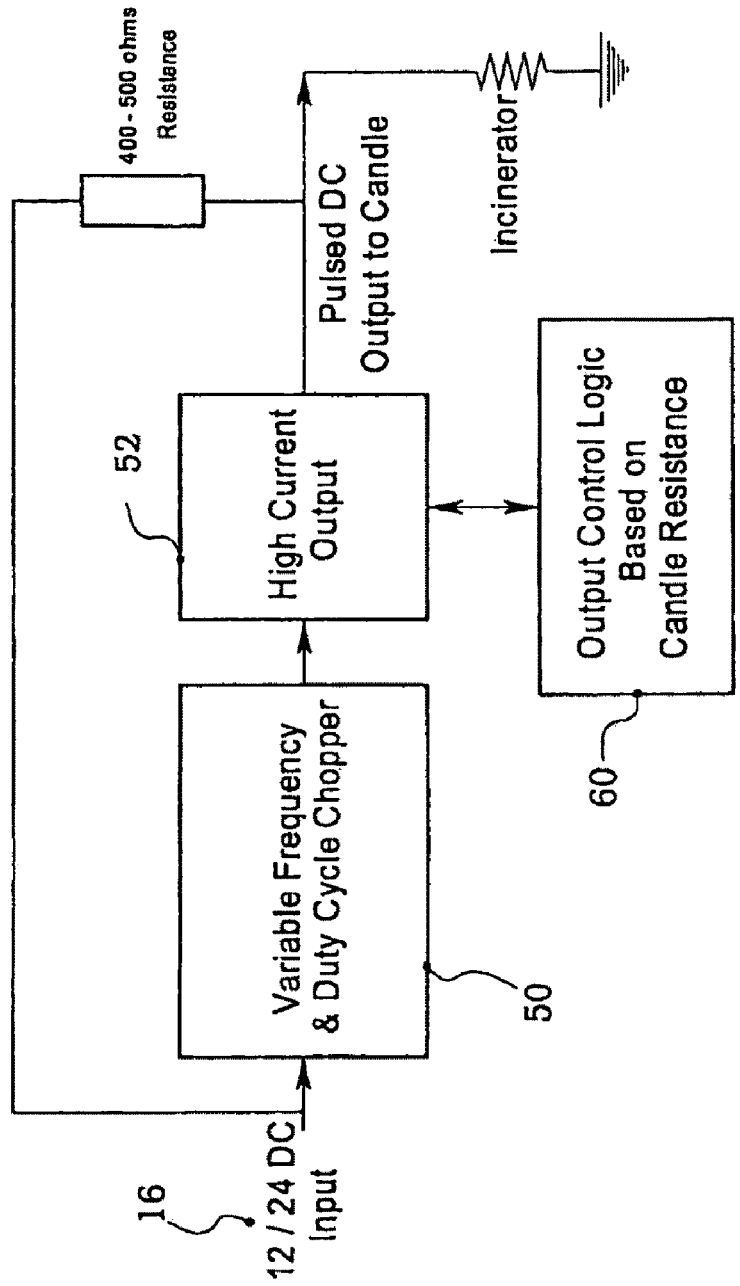
FIG. 4 is a schematic illustration of a control arrangement for a DC power supply system of the particulate converter of the present teachings.

Turning to FIGS. 3 and 4, the power supply for the particulate converter 10 may be a DC power supply 16. The DC power supply 16 may be 12V up to 48V DC power. The DC power supply 16 may be is fed to a chopper 50. The chopper 50 may be a variable frequency and duty cycle chopper 50 having an output that is fed to a high current output 52. The chopper frequency and duty cycle is tuned to the soot makeup in terms of dry vs. wet soot. The high current output 52 may be electrically communicated to the incinerator Dutch-screen 42.

The particulate converter 10 may additionally include a passive control system or arrangement 60 for controlling the application of electric power for incineration. The control arrangement 16 may include control logic for continuously monitoring the electrical resistance across the incinerator 24. When the incinerator power is off, another electric circuit incorporating a resistance in the order of 400 to 500 ohms may be engaged in series with the incinerator circuit or equivalent passive method. This circuit may be powered by 12V DC and the power consumption may be very small (e.g., approximately 0.1 watts). Measurement of voltage across the incinerator 24 represents the incinerator resistance. High incinerator voltage represents high incinerator resistance and vice verse. When the electrical resistance across the incinerator 24 drops below a predetermined value or established threshold, the high-current output 52 may be triggered to engage the incinerator 24. Pulsed DC power is applied and current as high as approximately 30 to 40 amps may be rushed to the incinerator 24 incinerating the soot cake. The power supply cycles may last for a pre-selected time duration. The pre-selected time duration may be small, for example, approximately 5 minutes. At the conclusion of the cycle, the electrical resistance of the incinerator 24 is measured again and, when it is below the established threshold, another power cycle begins immediately and so on, until soot is incinerated as expressed by increase in the electrical resistance of the incinerator 24 above the threshold value. A typical resistance is 0.5 to 1.0 Ohm, although the threshold value is dependent on the incinerator surface area. Large surface areas have low threshold values and vice versa. It should be noted that the soot cake is maintained all the time, only a small depth resulting in open circuit threshold is incinerated.

Figure 5:
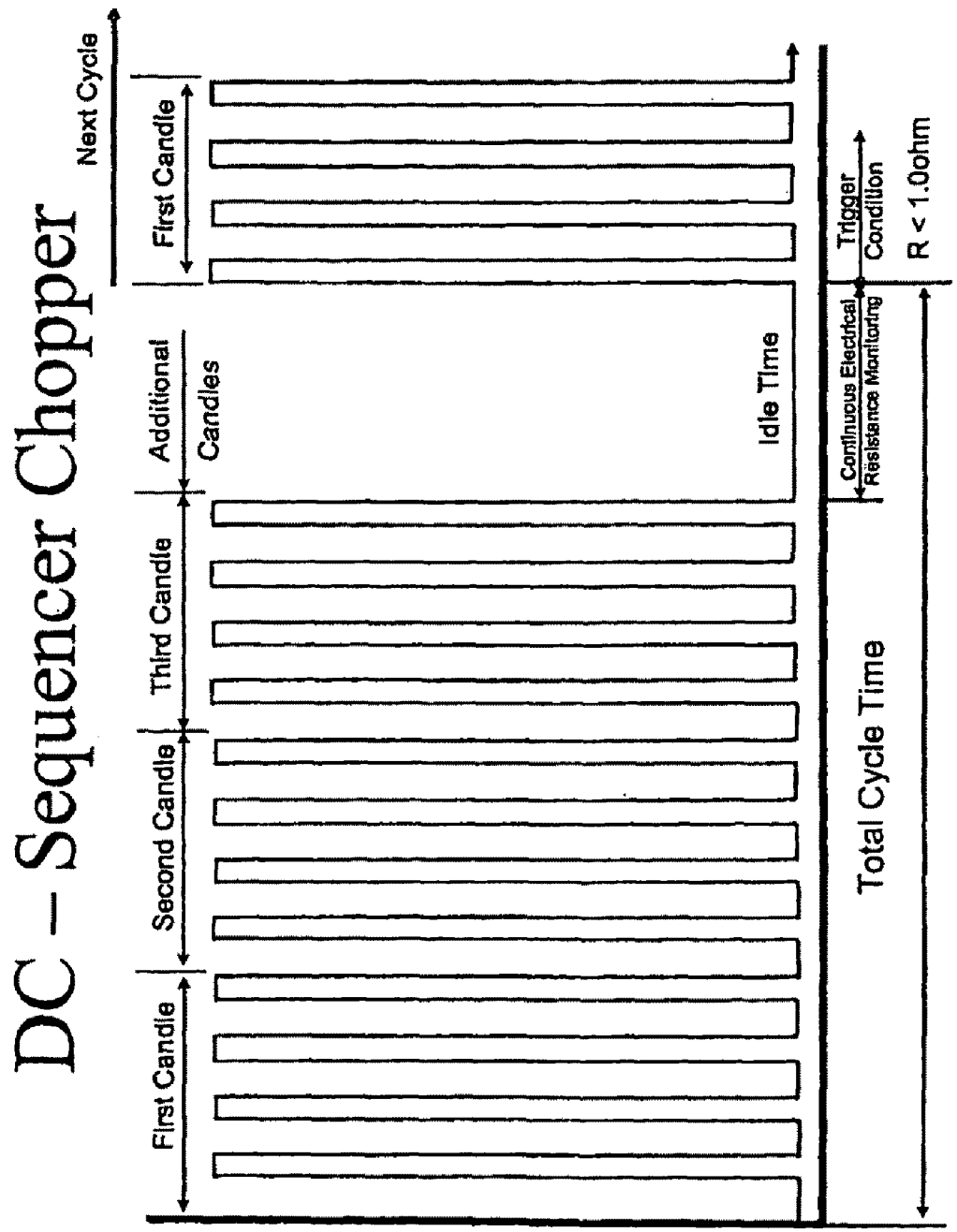
FIG. 5 is a schematic illustration of the pulsed DC power supply operating cycle for a particulate converter of the present teachings including a plurality of candles.

The electric power supply may be upgraded for multiple candles applications, which is typical for large diesel engines. FIG. 5 illustrates the power cycle for a multiple-candle particulate converter 10 (e.g., as shown in FIGS. 6 and 7). The power supply may engage the candles 12 in sequence for a predetermined time (e.g., 10 minutes), then measure the electrical resistance at one candle 12 and proceed as to whether a new power cycle will start or not.

C. Incineration Process and Operation

The incineration process as defined herein is a slow process in which soot collected and stored on both the composite wire mesh 22, inside the incinerator gap 45 and on the upstream side of the retaining screen 42 may be oxidized to harmless substances, mainly $CO_2$ and $H_2O$. The exothermal heat generated from oxidation of soot is diluted with the exhaust gases. There are four elements that contribute to the success of the incineration process. These elements may include: 1) moderate exhaust temperatures; 2) generation of sufficient amount of $NO_2$; 3) employment of base-metal catalyst in the incinerator gap; and 4) pulsed DC auxiliary power. The combination of the stated four elements may contribute to a statistically high probability of achieving efficient incineration at almost all driving/operating cycles of diesel engines. The net effect is achieving a balance between collected and incinerated soot. Both conditions of excessive soot collection or excessive soot incineration are not desirable. It will be appreciated that the present teachings may be employed in various systems that do not include all four elements. At temperatures as low as 200° C., incineration takes place but at a much slower rate. At temperatures close to 350° C., complete incineration is accomplished through $NO_2$ and the presence of base-metal catalysts. When exhaust temperatures approach 350° C. there is no need for electrical incineration and, as a result, the power chopper is automatically off. This is effective in reducing fuel penalty to low levels, estimated at 0.1% on some applications having frequent exhaust temperatures reading 350° C. at the converter inlet.

Although the electric power supply may provide sufficient heat to maintain incineration, the low exhaust temperatures (e.g., approximately 100° C.), render the incineration very slow and inefficient. Such extensive engine operating conditions, for example 30 to 50 hours, have low probability of occurrences. In real life, lack of effective incineration due to extensive low exhaust temperatures can result in an increase of back-pressure across the candle. If such conditions are prolonged further, large soot particles on the incinerator are released automatically through the incinerator Dutch-screen to the atmosphere relieving some of the excessive back-pressure. Such released particles are large in size and are outside the definition of PM 10 and PM 2.5, as such they do not constitute particulate pollution by definition. Further, the particulate converter will not interfere with engine operation in such low-probability events, or cause a plug-up as is the case with most particulate filtration media.

The particulate storage capacity of the composite wire mesh media 22 as well as the incinerator 24 is very high in comparison to wall-through traps. This renders the impact of excessive abnormal engine operating conditions, such as extensive idling or low engine loads, less severe on engine performance when compared with ceramic traps. Corrections to normal back-pressure are accomplished once engine loading is increased and exhaust temperatures reach 300° C. to 375° C.

It will be noticed that the electric power consumption in the form of pulsed DC is used exclusively to heat soot, and in the presence of $O_2$ and $NO_2$, it renders the incineration mechanism efficient. However, electric heat losses may be encountered through 1) exhaust flow cooling effect and 2) localities on the incinerator, where electrical resistance is relatively higher, the resulting electric current is low and in turn, incineration is slowed down. By monitoring the incinerator electrical resistance on a continuous basis, pulsed power is engaged automatically when probability of incineration is reached. This limits electrical power consumption to very low level with an estimated fuel penalty of about 0.1% in most mobile applications. When the exhaust temperatures reach 300° up to 375° C. maximum at the converter inlet, which is typical in most mobile applications, soot oxidation with $NO_2$ is sufficient to continuously clean accumulated soot without the need of electrical power assist. $NO_2$ from diesel engine is normally about 10% of total NOx. The addition of certain DOC's can increase $NO_2$ ratio to 30-50% dependent on temperature. This is typical provided that such temperatures 300-375° C. are encountered 10-20% of the time. At driving cycles below 300° C., electric power supply will assist with the incineration as the need arise automatically.

The base-metal catalysts are employed in the form of wires or screens and can employ single elements such as iron, copper, vanadium, calcium, magnesium, or a combination thereof. The catalysts can be in the form of wound wires, or in the form of screen wrapped upstream of the ceramic wire or net (not shown). In selecting a base-metal catalyst, it can be oxidized rapidly in such operating environment. Therefore, the thickness of the catalyst screen should be very small to keep the total incinerator gap thickness small. This criterion renders metallic catalyst to be most preferably about 0.005 inches (0.1 mm) in thickness. Base-metal catalysts are effective in lowering soot ignition temperatures, thus greatly extending the range of effective incineration.

Figure 10:
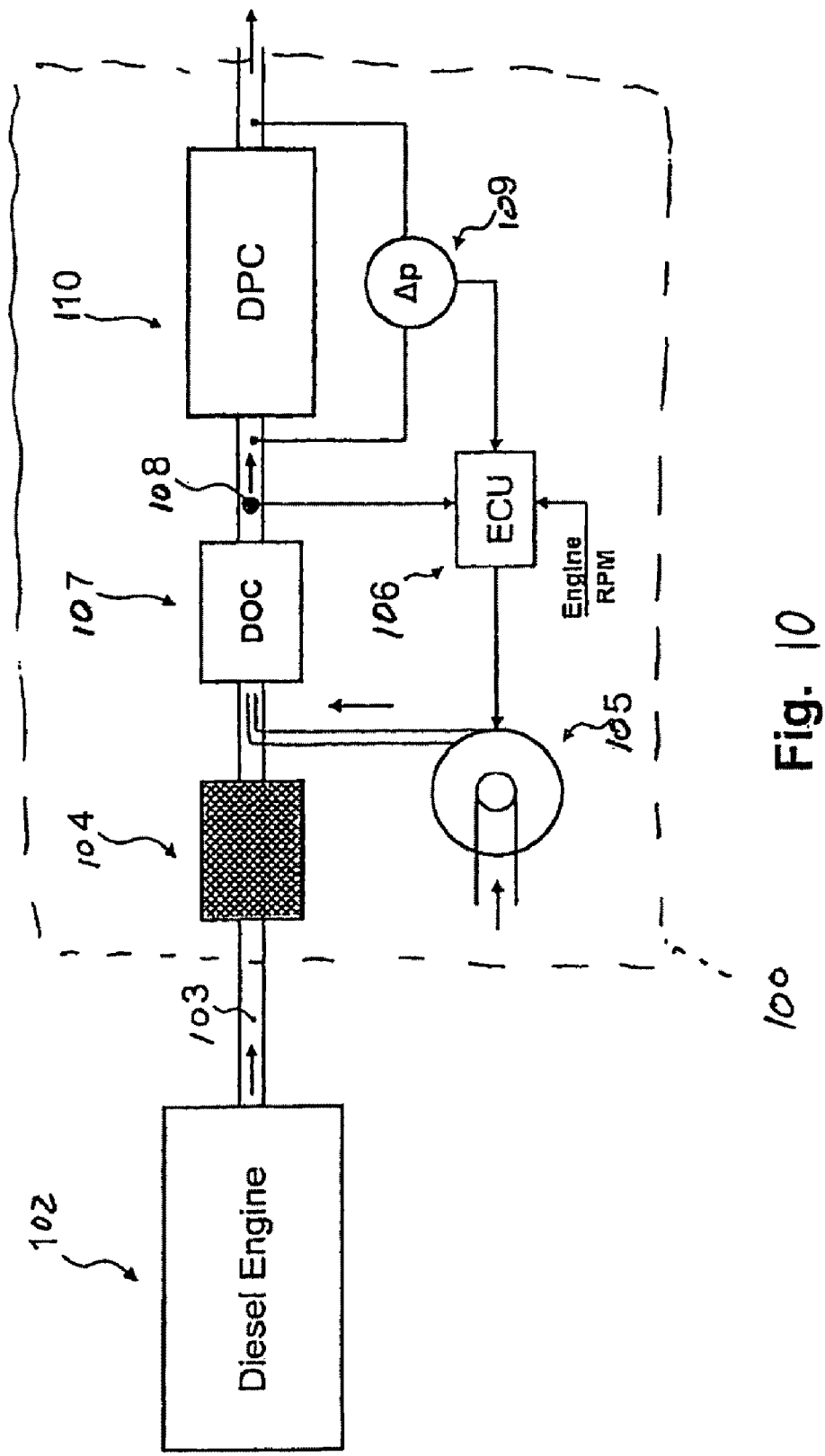
FIG. 10 is a schematic illustration of an exhaust after treatment system for a diesel engine, the system showing a diesel particulate operatively associated with diesel engine.

Turning to the schematic diagram of FIG. 10, illustrated is an after treatment system 100 for a diesel engine in construction with the present teachings. The system 100 is shown operatively associated with a diesel engine 102. The diesel engine 102 may be of any type, but may particularly comprise a diesel engine having high exhaust temperature profiles.

Diesel engine exhaust may be introduced to the system 100 through a cooling pipe 103. The radiant cooling pipe 103 may be designed to limit the maximum temperature to an intermediate level. In this regard, an exhaust temperature of about 700°-750° C. may be reduced to approximately 400° C., for example.

Engines that experience a transient mode of operation, such as mobile applications, can incorporate a thermal stabilizer having high thermal inertia. In this regard, a thermal stabilizer 104 may be provided for averaging of exhaust temperature fluctuations. Such a stabilizer can be constructed from sintered knitted metallic wire having sufficient weight to provide high thermal inertia, high permeability to lower pressure drop and good thermal conductivity to reduce temperature fluctuations. Knitted wires can exchange heat quickly with the exhaust gases two ways heating and cooling. As a result, fluctuation and transient exhaust temperature peaks and lows are leveled and averaged. This results in more desirable exhaust temperature profiles for incineration since peak temperatures could lead to uncontrolled incineration and low temperatures do not provide incineration. The thermal stabilizer 104 will be understood to be conventional insofar as not otherwise described herein.

The system 100 may include at least one cooling device selected from a group including a blower for injection of ambient air into the exhaust, a pump for injection of water into the exhaust, and an exhaust/outside air heat exchanger operating with a modulated air fan. In this regard, a blower 105 may be provided to inject outside cooling air ahead of a diesel oxidation catalyst 107. The blower 105 may be controlled in a manner discussed below to maintain high soot retention in the converter above threshold values and to avoid spontaneous incineration. Briefly, the blower 105 may be activated by an electronic control module 106 as needed when a soot build-up cycle is desired. As will be discussed, the blower 105 may be controlled by the electronic control module 106 as a function of pressure across the diesel particulate converter 110 and an intake temperature of the converter 110.

Some diesel engines are characterized as having high-temperature exhaust profiles that when coupled with highly active diesel oxidation catalyst (DOC) can provide a highly effective continuous but intermittent incineration. For example, certain oxidation catalysts can provide NO to NO2 conversion efficiency of 25% at exhaust temperatures of 150° to 175° C. Such conversion efficiency can provide adequate incineration. At higher exhaust temperatures, the conversion is higher and the incineration rate is higher. Excessive incineration can lead to a drop in collection efficiency. Therefore, it is desirable to provide means to control the incineration process to ensure that soot collection efficiency and the associated back pressure are maintained at optimum conditions for engines operating at transient as well as steady-state conditions.

As described, the system 100 may include a feedback control system for the control of exhaust gas temperatures. The feedback control system may include closed loop control logic based on maintaining the back pressure at an optimum level at a given engine RPM and a converter inlet temperature. In this regard, the feedback control system may control exhaust gas temperatures based on factors including pressure drop across the DPC, temperature ahead of the DPC and engine RPM. The feedback control system may be operative to monitor exhaust temperature and provide cooling in response to predetermined conditions. The measured pressure drop at a given engine operation conditions such as temperature ahead of the converter and engine RPM need to be correlated to specific pressure drop and compared against reference pressure drop data. Such reference pressure drop data may be provided in a look-up table at certain temperatures and engine RPM's. For evaluation purposes, the specific pressure drop is compared to the equivalent pressure drop at reference conditions.

Optimum converter conditions are based on best soot reduction efficiency and reasonable pressure drop, which may be established through mapping. Several alternatives for the control of exhaust cooling may be acceptable. For example, injection of cold fluid such as outside air or water may be effective. Alternatively, exhaust/outside air heat exchanger operating with modulated air fan that provide convection cooling of the exhaust is also effective.

The ECU 106 may operate to control the blower 105 for the introduction of cooling air in response to a first signal. The first signal may be generated in response to a predetermined pressure. This pressure is measured across a diesel particulate converter 110 by a differential pressure sensor 109. The diesel particulate converter may be similar to that described above. Should the back pressure be lower than the target one, the diesel particulate converter is allowed to accumulate soot. This is accomplished by limiting incineration through activation of cooling mode. On the other hand, if the back pressure is higher than the target pressure, incineration is allowed until the back pressure reaches the target back pressure by stopping the cooling mode. Fluctuation in correlated back pressure from targeted back pressure up to 10-20% is allowed. In a way, such a control process is similar to a thermostat control function in a heating system.

The subject control function is accomplished by allowing incineration to take place or curbing/limiting incineration to the minimum. This is achieved by cooling the exhaust gases to the lowest level for soot accumulation. Alternatively, the exhaust gases temperatures are allowed to increase to provide maximum incineration. An effective, simple method is to inject outside air with the blower 105 into the exhaust ahead of the DOC 107. The injected air can be modulated for maximum effectiveness. Where a thermal stabilizer is used, blower response time becomes less critical since exhaust temperatures fluctuations are reduced. The amount of injected air is a small fraction of the exhaust air, typically less than 10%, for example.

The system 100 may include safety feature for measuring the exhaust temperature ahead of the DPC 110 to ensure the maximum exhaust temperature at any engine operating condition does not exceed a certain threshold level that could result in uncontrolled incineration. In this regard, the temperature ahead of the converter is monitored and compared to a predetermined set temperature. The signal may be generated by a temperature sensor 108 positioned in the intake of the DPC 110 in response to a predetermined inlet temperature. When the exhaust temperature is high, the effect may potentially lead to accelerated or uncontrolled incineration (equivalent to uncontrolled regeneration). When such temperature conditions arise, regardless of the back pressure across the converter 110, maximum air injection by the blower is applied to lower the temperature until the safe exhaust temperature threshold ahead of the converter 110 is reached.

In operation, the feedback control system may operate to provide effective incineration by monitoring pressure drop across the DPC, monitoring temperature signal ahead of the DPC and engine RPM. The feedback control system may compute the specific pressure drop at a given engine operating condition and compare it to threshold data. Threshold data may be taken from a lookup table, for example. In this regard, the feedback control system is operative to control an exhaust cooling function when a monitored specific pressure drop is below a predetermined specific pressure drop; and when a monitored temperature is above a predetermined temperature threshold to maintain converter optimal performances.

In various examples the present teachings provide a DPC that is a passive device free of active components, sensors and electrical components. Total system operation may be completely independent from engine operation. The system may have very high agglomeration efficiency for submicron and non-particles reaching 95 to 99%. The majority of these agglomerated particles are incinerated to harmless byproduct. As is the case with comparable devices in this field, some particles escape to the tail pipe. Such particles are large in size and do not constitute particulate pollution in cases where their size exceeds 10 microns for PM 10 standards and where their size exceeds 2.5 microns for PM 2.5 standards. As a result, the converter has two sets of particulate reduction efficiencies, measured (based on total escaped particles) and recognized efficiency (measured less large particles weight).

The systems described herein may further comprise an exhaust gas recirculation (EGR) system fluidly connecting exhaust leaving the DPC to the diesel engine and a valve to selectively divert exhaust gas from the DPC to EGR system wherein the exhaust gas injected in the engine air intake has been subcooled and substantially cleaned of any fugitive particles. Adding such a system is referred to as low-pressure EGR system. Such system provides superior performance when compared to high-pressure EGR systems since the low-pressure EGR system provides cleaning and subcooling of the gasses before injection in the engine air intake, which cannot be accomplished with high-pressure systems. The EGR system may be substantially similar to the ERG system described in U.S. Pat. No. 7,266,943. U.S. Pat. No. 7,266,943 is incorporated by reference as if fully set forth herein.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A system for the collection and incineration of particulate matter to clean exhaust of a diesel engine, the system comprising:
   a diesel particulate converter (DPC) having a housing and at least one candle located in the housing;
   a diesel oxidation catalyst (DOC) in the exhaust path;
   at least one exhaust cooling device for the control of exhaust temperature; and
   a feedback control system for the conditioning and control of exhaust gas temperatures based on pressure drop across the DPC, temperature ahead of the DPC and engine RPM.

2. The system of claim 1, wherein the candle includes:
   at least one first radial layer of wire mesh, approximately 0.2 inches to approximately 0.5 inches in thickness, defining a composite wire mesh agglomerator; and
   at least one retaining screen radially configured around the exterior of the wire mesh agglomerator for trapping and retention of agglomerated soot.

3. The system of claim 2, wherein the composite wire mesh agglomerator and the retaining screens cooperate to provide a deep bed for soot collection having long resident time.

4. The system of claim 3, wherein the deep bed creates sufficient contacts and high residence time to allow for the conversion of NO2 to N2 and CO2, thus reducing NOx emission by an order of 10-15%.

5. The system of claim 1, wherein the candle includes a wire mesh agglomerator and a plurality of retaining screens, and further wherein the DOC cooperatives with engine exhaust temperature profiles to generate sufficient $NO_2$ for soot incineration on the composite wire mesh agglomerator and the retaining screens.

6. The system of claim 5, wherein the DOC is constructed of a sintered wire mesh matrix to provide low pressure drop, high mixing and turbulent conditions in the exhaust allowing for low precious metal loadings.

7. The system of claim 1, wherein the feedback control system is operative to monitor exhaust temperature and provide cooling in response to predetermined conditions, the system further comprising at least one cooling device selected from a group including a blower for injection of ambient air into the exhaust path; a pump for injection of water into the exhaust path; and an exhaust/outside air heat exchanger operating with a modulated air fan.

8. The system of claim 7, wherein the feedback control system is operative to provide effective incineration by monitoring pressure drop signal across the DPC, monitoring temperature signal ahead of the DPC and engine RPM, computing the specific pressure drop at a given engine operating condition and comparing the specific pressure drop to threshold data.

9. The system of claim 7, wherein the feedback control system is operative to control an exhaust cooling function in response to at least one of the following conditions:
when a monitored specific pressure drop is below the predetermined specific pressure drop; and
when a monitored temperature is above the predetermined temperature threshold.

10. The system of claim 1, further comprising a thermal stabilizer in the exhaust path to be located ahead of the DOC to reduce temperatures below 400 degrees Celsius and increase the frequency of $NO_2$ incineration.

11. The system of claim 10, wherein the thermal stabilizer comprises wire mesh having high thermal conductivity, high thermal inertia and high permeability.

12. The system of claim 11, wherein the wire mesh is a rigid wire mesh matrix.

13. The system of claim 1, wherein the candle includes:
at least one first radial layer including the DOC;
at least one second radial layer defining a spark arrest screen;
at least one third radial layer defining a composite wire mesh agglomerator; and
at least one retaining screen radially configured around the exterior of the wire mesh agglomerator for the trapping of agglomerated soot.

14. The system of claim 1, wherein the particulate converter is a passive device free of active components, sensors, and electric components in proximity to an engine exhaust system.

15. The system of claim 1, wherein operation of the system is completely independent from engine operation.

16. The system of claim 1, wherein the system has very high agglomeration efficiency for submicron and nano-particles resulting in particles escaping from the system to be large in size such that they do not constitute particulate pollution in cases where their size exceeds 10 microns for PM 10 standards and where their size exceeds 2.5 microns for PM 2.5 standards.

17. The system of claim 1, further comprising an exhaust gas re-circulation (EGR) system, fluidly connecting exhaust leaving the particulate converter to the diesel engine and a valve to selectively divert exhaust gas from the particulate converter to EGR system wherein the exhaust gas injected in the engine air intake has been sub-cooled and substantially cleaned of any fugitive contaminants.

18. A method of $NO_2$ incineration of particulate matter to clean exhaust of a diesel engine, the method comprising:
providing a diesel particulate converter (DPC) having a housing and at least one candle located in the housing;
routing diesel engine exhaust along an exhaust path extending from the diesel engine through the DPC;
treating the diesel engine exhaust with a diesel oxidation catalyst (DOC) disposed in the exhaust path; and
controlling exhaust gas temperatures with a feedback control system through selective control of an exhaust cooling device as a function of pressure drop across the DPC, temperature ahead of the DPC and engine RPM.

19. The method of claim 18, further comprising trapping of agglomerated soot within the candle.

20. A diesel particulate converter (DPC) for the collection and incineration of particulate matters from diesel engine exhaust, the DPC comprising:
an exhaust path extending from the diesel engine through the DPC;
a housing;
at least one candle located in the housing;
an electrical incinerator adapted; and
a pulsed power supply electrically connected to the electrical incinerator for incinerating soot collected within the candle.

21. The diesel particulate converter of claim 20, wherein the pulsed power supply is a DC power supply.

22. The diesel particulate converter of claim 20, further comprising a chopper, wherein the DC power supply is fed to the chopper and a high current output of the chopper is electrically communicated to the incinerator.

23. The diesel particular converter of claim 20, further comprising a passive arrangement for controlling the application of electrical power for incineration, the passive arrangement adapted to monitor an electrical resistance across the incinerator and deliver the pulsed power to the incinerator when the electrical resistance across the incinerator drops below a predetermined value.

* * * * *